United States Patent [19]

Ide et al.

[11] Patent Number: 4,485,882

[45] Date of Patent: Dec. 4, 1984

[54] ENGINE COMPARTMENT FOR AUTOMOBILES

[75] Inventors: Masayuki Ide; Satoshi Suzuki, both of Tokyo, Japan

[73] Assignee: Honda Giken Kogyo Kabushiki Kaisha, Tokyo, Japan

[21] Appl. No.: 399,311

[22] Filed: Jul. 19, 1982

[30] Foreign Application Priority Data

Jul. 18, 1981 [JP] Japan .................... 56-107137[U]

[51] Int. Cl.³ .............................................. B62D 25/10
[52] U.S. Cl. ................... 180/68.6; 180/69.21; 180/297
[58] Field of Search ............... 180/297, 54 A, 69 R, 180/69 C, 68 R, 68 P, 89.17, 69.2, 69.21, 68.6, 68.4, 68.1; 123/41.49, 41.3, 41.12

[56] References Cited

U.S. PATENT DOCUMENTS

| | | | |
|---|---|---|---|
| 2,468,809 | 5/1949 | Brock et al. | 180/68 P |
| 2,576,316 | 11/1951 | Toth | 180/68 P |
| 3,863,729 | 2/1975 | Fummetti et al. | 180/89.17 |
| 4,186,476 | 2/1980 | Mair et al. | 180/69 C |
| 4,189,919 | 2/1980 | Goscenski | 123/41.12 |

FOREIGN PATENT DOCUMENTS

| | | | |
|---|---|---|---|
| 2702130 | 7/1978 | Fed. Rep. of Germany | 180/69 R |
| 0066223 | 6/1977 | Japan | 180/68 R |
| 1141581 | 1/1969 | United Kingdom | 180/69 C |

Primary Examiner—David M. Mitchell
Attorney, Agent, or Firm—Armstrong, Nikaido, Marmelstein & Kubovcik

[57] ABSTRACT

An engine compartment is provided for automobiles which comprises an engine compartment housing an engine and a radiator disposed in front of the engine. The engine compartment has upper and front openings therein and also has an upper covering which is pivotally connected at the rear end thereof to the automobile body. The upper covering has a closed position for covering the upper opening, and an open position for opening the upper opening and also has a front covering which is pivotably connected to the automobile body. The front covering has a closed position for covering the front opening and an open position for opening the front opening. The radiator is offset from the center of the engine in the transverse direction of the automobile.

7 Claims, 2 Drawing Figures

ENGINE COMPARTMENT FOR AUTOMOBILES

BACKGROUND OF THE INVENTION

1. Field of the Invention

This invention relates to an engine compartment device for automobiles and, more particularly, to an engine compartment device for automobiles consisting of an engine compartment which houses an engine and a radiator disposed in front of the engine therein, and which has an upper opening adapted to be opened and closed by moving a bonnet or hood hinged at its rear end to the automobile body and a front opening adapted to be opened and closed by moving a ventilating grill pivotably connected to the automobile body.

2. Description of the Prior Art

When the hood of a conventional engine compartment of this kind is opened, a worker can take a wide view of the interior of the engine compartment from the front, right and left sides of the automobile without being obstructed by the hood. Accordingly, the engine and its attachments can be inspected and repaired easily. When the clearance in front of the engine even in such an engine compartment device is narrowed to minimize the dimensions of the engine compartment, it becomes difficult for the worker to extend his hands in front of the engine to inspect and repair the front portions thereof.

SUMMARY OF THE INVENTION

It is an object of the present invention to provide an engine compartment for automobiles which includes a ventilating grill covering the front opening of the engine compartment which is formed so that the ventilating grill can be opened and closed. The radiator is offset from the center of the front opening to either the right or left so as to permit the front portions of the engine to be inspected and repaired from both upper and front openings of the engine compartment irrespective of the dimensions of the clearance in front of the engine.

The above and other objects and advantageous features of the invention will become apparent from the following description of the preferred embodiment taken in conjunction with the accompanying drawings.

DETAILED DESCRIPTION OF THE PREFERRED EMBODIMENT

Figure 1:
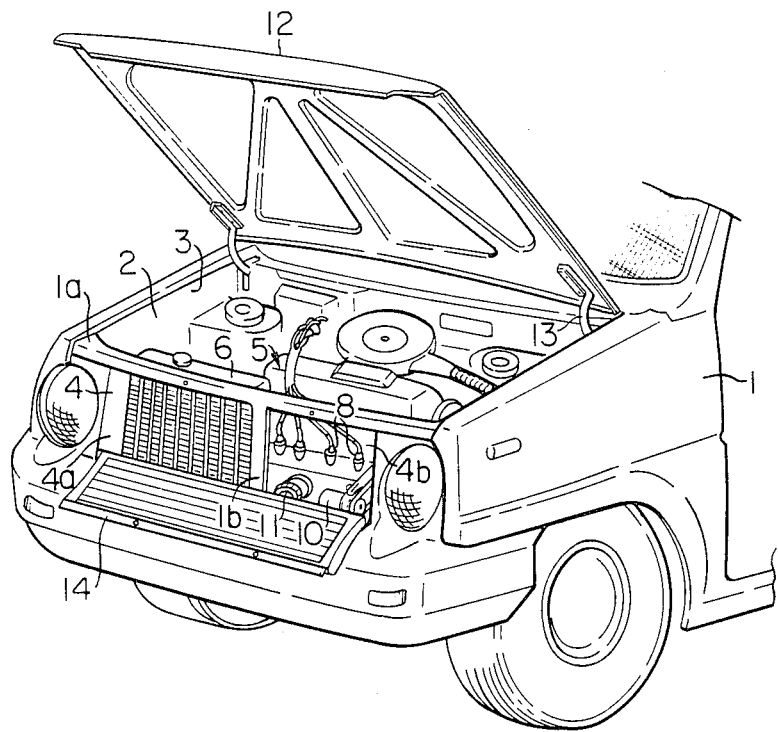
FIG. 1 is a perspective view of the front portion of an automobile having an engine compartment according to the present invention with the hood and ventilating grill opened.
Figure 2:
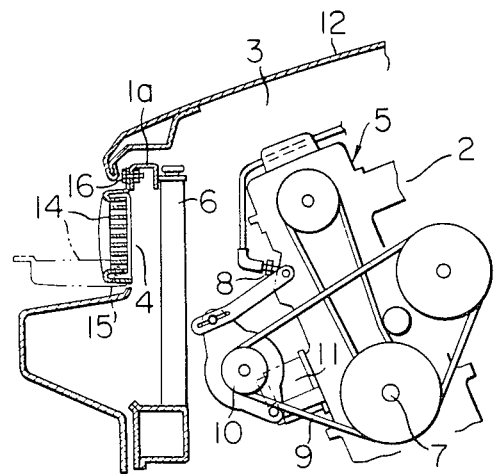
FIG. 2 is a side elevational view in longitudinal section of the same portion of an automobile shown in FIG. 1, with the hood and ventilating grill closed.

An embodiment of the present invention will now be described with reference to the drawings. The front portion 1 of an automobile has an engine compartment 2 formed therein. The front portion 1 has an upper opening 3 and a front opening 4. A central frame 1b divides the front opening 4 into right and left portions, i.e., first and second openings 4a, 4b and is joined to a front frame 1a of the automobile body 1 which defines the border between the openings 3, 4. The engine compartment 2 houses therein an engine 5 and an engine-cooling radiator 6 disposed in front of the engine. The radiator 6 is positioned just behind the first opening 4a so as to be offset from, and not overlapping, the engine 5 in the transverse direction of the automobile body 1. The second opening 4b functions as a working opening, by which the engine compartment 2 can be opened directly to the outside thereof at the front side of the automobile body 1. The engine 5 is disposed laterally so the crankshaft 7 thereof extends in the transverse direction of the automobile. Ignition plugs 8, a generator 10 which is driven by the crankshaft 7 via a belt 9, and an oil filter 11 are provided on the front side of the engine 5 in the vicinity of the second opening 4b.

A hood 12 closes the upper opening 3 of the engine compartment 2 and is pivotally connected at its rear end to the automobile body 1 by hinges 13 in such a manner that the hood 12 can be opened at its front end. The front end of the hood 12 is adapted to be locked to the automobile body 1 by a known latch mechanism (not shown), which is manually released or remotely controlled from the interior of the automobile. A ventilating grill 14 covers the front opening 4 and is pivotally connected at its lower end to the automobile body 1 by hinges 15 in such a manner that the ventilating grill 14 can be opened at its upper end. The upper end of the ventilating grill 14 is detachably fastened to the front frame 1a with connecting members 16, such as bolts and clips. The connecting members 16 in the embodiment shown in the drawings are normally covered by the front end portion of the hood 12. In this structure, the connecting members 16 cannot be removed unless the hood 12 is opened. The ventilating grill 14 is thus conveniently formed so it cannot be opened unnecessarily even though a special lock is not required.

In the above-described structure, in order to replace, for example, the ignition plugs 8 or oil filter 11 with new ones or adjust the tension of the belt 9 for driving the generator 10, the hood 12 and ventilating grill 14 are opened as shown in FIG. 1 to open the upper and front sides of the engine compartment 2 at the upper opening 3 and second opening 4b, i.e., working opening in the front opening 4, respectively. Thus, a worker can easily carry out the above-mentioned operations because he can insert his hands into the engine compartment 2 from both of the openings 3, 4b.

While the automobile is running, substantially half of the air entering the ventilating grill 14 is supplied to the radiator 6 via the first opening 4a in the front opening 4 to cool it. Substantially, the other half of the air entering the ventilating grill 14 is supplied to the engine 5 via the second opening 4b to cool it directly. Accordingly, the engine 5 is effectively cooled with both water and air.

In the engine compartment according to the present invention as described above, the hood can be opened at the front end thereof, a ventilating grill covering the front opening of the engine room is pivotably connected to the automobile body with hinges at a lower end thereof, and the radiator is disposed behind one half of the front opening. When the ventilating grill is opened, the other half portion of the front opening serves as a working opening through which the engine compartment is opened to the outside at the front side thereof. Accordingly, when the hood and ventilating grill are opened, the front side of the engine can be inspected and repaired easily without being obstructed by the radiator from both the upper and front openings irrespective of the dimensions of the clearance in front of the engine. Therefore, the present invention very advantageously minimizes the size of the engine compartment.

The present invention is not, of course, limited to the above embodiment and it may be modified in various ways within the scope of the appended claims.

What is claimed is:

1. An engine compartment for automobiles, comprising an engine compartment housing an engine and a radiator disposed in front of said engine, said engine compartment having upper and front opening parts therein, an upper covering means pivotally connected at the rear end thereof to the automobile body, said upper covering means having a closed position for covering said upper opening part and an open position for opening said upper opening part, and a front covering means, pivotally connected to said automobile body, said front covering means having a closed position for covering said front opening part and an open position for opening said front opening part, said radiator being offset from the center of said engine in the transverse direction of the automobile such that access to the engine through said front opening part is unobstructed from the front of the automobile.

2. An engine compartment according to claim 1 wherein said engine is positioned such that the crank shaft extending therefrom extends in the transverse direction of the automobile.

3. An engine compartment according to claim 1 wherein said front covering means is a ventilating grill.

4. An engine compartment according to claim 1 or 3 wherein said front covering means is hinged to said automobile body at a lower end thereof.

5. An engine compartment according to claim 1 wherein said engine compartment further includes connecting means that are normally covered by the front end portion of the upper covering means for detachably fastening an upper end portion of said front covering means to the front frame of said automobile body so that the front covering means cannot be opened without first opening the upper covering means.

6. An engine compartment according to claim 5 wherein said connecting means is removable unless covered by said upper covering means when said upper covering means is in said closed position.

7. An engine compartment according to claim 1 wherein said front opening part includes two front openings, one of said two front openings opening directly into the engine compartment, such that access to said engine through said one of said two front openings is unobstructed.

* * * * *